United States Patent
Inforzato et al.

(10) Patent No.: US 11,300,992 B2
(45) Date of Patent: Apr. 12, 2022

(54) MECHANISM FOR IMPLEMENTING INDEPENDENT TIME IN A HOSTED OPERATING ENVIRONMENT

(71) Applicant: Unisys Corporation, Blue Bell, PA (US)

(72) Inventors: Robert F. Inforzato, Blue Bell, PA (US); Dwayne E. Ebersole, Lancaster, PA (US); Daryl R. Smith, Irvine, CA (US); Grace W. Lin, Irvine, CA (US); Andrew Ward Beale, Irvine, CA (US); Loren C. Wilton, Rancho Cucamonga, CA (US)

(73) Assignee: Unisys Corporation, Blue Bell, PA (US)

( * ) Notice: Subject to any disclaimer, the term of this patent is extended or adjusted under 35 U.S.C. 154(b) by 219 days.

(21) Appl. No.: 16/566,644

(22) Filed: Sep. 10, 2019

(65) Prior Publication Data

US 2021/0072786 A1 Mar. 11, 2021

(51) Int. Cl.
*G06F 1/12* (2006.01)
*G06F 9/455* (2018.01)
*G06F 9/4401* (2018.01)

(52) U.S. Cl.
CPC ............. *G06F 1/12* (2013.01); *G06F 9/4555* (2013.01); *G06F 9/4406* (2013.01)

(58) Field of Classification Search
CPC ................. G06F 1/32; G06F 1/12; G06F 9/44
See application file for complete search history.

(56) References Cited

U.S. PATENT DOCUMENTS

| 9,459,652 | B1 * | 10/2016 | Landers | G06F 1/12 |
| 2007/0028052 | A1 * | 2/2007 | Armstrong | G06F 9/5077 711/129 |
| 2007/0033589 | A1 * | 2/2007 | Nicholas | G06F 9/4825 718/1 |
| 2012/0278645 | A1 * | 11/2012 | Cornelius | G06F 1/12 713/400 |
| 2016/0048405 | A1 * | 2/2016 | Lang | G06F 9/45558 718/1 |

* cited by examiner

*Primary Examiner* — Keshab R Pandey

(57) ABSTRACT

Methods and systems for implementing independent time in a hosted operating environment are disclosed. The hosted, or guest, operating environment, can be seeded with a guest time value by a guest operating environment manager that maintains a time delta between a host clock time and an enterprise time. The guest operating environment can subsequently manage its guest clock from the guest time value. If the guest operating environment is halted, the guest operating environment manager can manage correspondence between the host clock time and the enterprise time by periodically assessing divergence between actual and expected values of the host clock time.

15 Claims, 8 Drawing Sheets

MECHANISM FOR IMPLEMENTING INDEPENDENT TIME IN A HOSTED OPERATING ENVIRONMENT

BACKGROUND

Computer system virtualization allows multiple operating systems and processes to share the hardware resources of a host computer. Ideally, the system virtualization provides resource isolation so that each operating system does not realize that it is sharing resources with another operating system and does not adversely affect the execution of the other operating system. Such system virtualization enables applications including server consolidation, co-located hosting facilities, distributed web services, applications mobility, secure computing platforms, and other applications that provide for efficient use of underlying hardware resources.

Although in general isolation between a hosted environment and a hosting environment is desired, some resources from the hosting environment must be provided to the hosted operating environment for proper operation. For example, typically, time in a guest operating environment is synchronized with the time managed within the host environment (e.g., they are the same). However, in the context of an enterprise class guest operating environment, this is not desirable. Rather, an enterprise class guest operating environment requires that its clock and time advancement be insulated from the clock of the hosting environment, for example because that guest operating environment must synchronize its time with other guest operating environments or an enterprise network.

In some instances, the hosted environment may be provided access rights to modify the time managed by the hosting environment. However, this may not always be the case. For example, a hosted environment may reside on a host computer that also hosts other environments. In such situations, the hosted environment may not be allowed to modify the time of the hosting environment because it may adversely affect other hosted environments. Accordingly, it is desirable to somehow manage time correspondence between a hosted environment with a hosting environment, while still synchronizing the hosted environment time with an enterprise network time.

Still further issues arise due to the possibility of a halt or restart of the hosted environment. Coordination of system time between the hosting environment and the hosted environment remains desirable in this instance. However, a hosting environment may gain or lose time relative to an enterprise time, and therefore the relative times between the hosting environment and enterprise may diverge during the time a hosted environment is halted, leading to potential further time discrepancies.

SUMMARY

In summary, the present disclosure relates to system and methods for implementing independent time in a hosted, or guest, operating environment, from the time that is used by a host computing system, and managed using a host operating environment.

In a first aspect, a method of synchronizing time between a guest operating environment and a hosting operating environment executing on a host computing system is disclosed. The method includes, within a guest operating environment manager executing within a hosting operating environment, maintaining a time delta between a host clock and an enterprise time to be used by a guest operating environment. The method further includes, upon initialization of the guest operating environment within a hosting operating environment: obtaining a host clock time; generating a guest clock time that is based on the host clock time and a time delta managed by the guest operating environment manager; and seeding the guest operating environment with the guest operating time. The method further includes, during execution of the guest environment, managing the guest operating time within the guest environment.

In a second aspect, a system for synchronizing time between a guest operating environment and a hosting operating environment executing on a host computing system is disclosed. The system includes a guest operating environment executing on the host computing system, the guest operating environment being hosted by the hosting operating environment. The system further includes a guest operating environment manager executing on the host computing system within the hosting operating environment. The guest operating environment manager includes a time synchronization subsystem which, when executed by the guest operating environment manager on the host computing system, causes the host computing system to: obtain a host clock time from a hosting operating environment; generate a guest clock time that is based on the host clock time and a time delta managed by the guest operating environment manager; and at initiation of the guest operating environment, seed the guest operating environment with the guest operating time. During execution of the guest environment, the guest operating environment manages the guest operating time independently of the host clock time.

In a third aspect, a system for synchronizing time between a guest operating environment and a hosting operating environment executing on a host computing system is disclosed. The system includes a host computing system comprising a processor and a memory communicatively connected to the processor. The memory stores instructions which, when executed, cause the host computing system to perform: within a guest operating environment manager executing within a hosting operating environment, maintaining a time delta between a host clock and an enterprise time to be used by a guest operating environment; upon initialization of the guest operating environment within a hosting operating environment: obtaining a host clock time; generating a guest clock time that is based on the host clock time and a time delta managed by the guest operating environment manager; and seeding the guest operating environment with the guest operating time; and during execution of the guest environment, managing the guest operating time within the guest environment.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
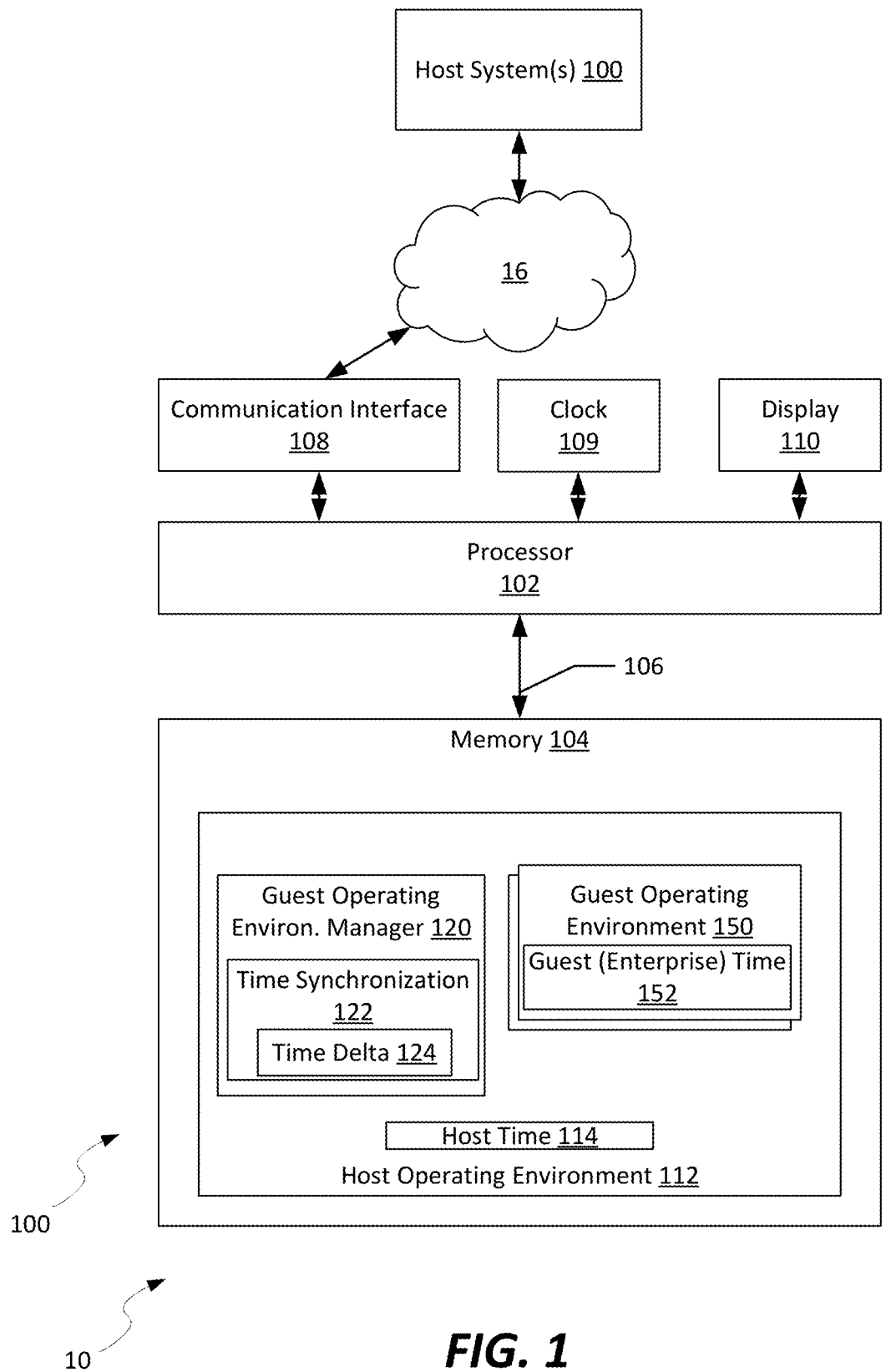
FIG. 1 illustrates an example computing environment including a network of host computing systems, a host operating environment, and one or more guest operating environments in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

As briefly described above, embodiments of the present invention are directed to methods and systems for implementing independent time in a hosted operating environment are disclosed. The hosted, or guest, operating environment, can be seeded with a guest time value by a guest operating environment manager that maintains a time delta between a host clock time and an enterprise time. The guest operating environment can subsequently manage its guest clock from the guest time value. If the guest operating environment is halted, the guest operating environment manager can manage correspondence between the host clock time and the enterprise time by periodically assessing divergence between actual and expected values of the host clock time.

By utilizing a guest operating environment manager to track differences between a host clock time and an enterprise time that is to be utilized by the guest operating environment, the guest operating environment need not directly modify a host clock time, which might adversely affect other guest partitions executing within the host environment. Additionally, the guest operating environment manager can more easily manage divergence of the host clock time during periods in which the guest operating environment may be halted. Accordingly, management of guest, or hosted, time (which may correspond to enterprise time for a network of guest operating environments spread across host computing systems) may be simplified.

Referring first to FIG. 1, an example environment 10 in which aspects of the present disclosure can be implemented is shown. The environment 10 includes a host computing system 100, communicatively connected to within an enterprise network 16 to one or more other host computing systems 100.

The host computing system 100 includes a processor 102 communicatively connected to a memory 104 via a data bus 106. The processor 102 can be any of a variety of types of programmable circuits capable of executing computer-readable instructions to perform various tasks, such as mathematical and communication tasks. The processor 102 may further be communicatively connected to a display 110, as well as a system clock 109.

The memory 104 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

In the embodiment shown, the memory 104 stores computer executable instructions that include, for example, a host operating environment 110. The host operating system 110 can be any of a number of operating environments, such as a commodity operating system (e.g., a Linux or Windows-based operating environment). In such systems, a host time 114 is managed by the operating environment, based on operation of the system clock 109. Due to variances in the system clock 109, the host time may vary from time in other host computing systems, or a generally-accepted time for an enterprise.

Often in enterprise environments, a host time 114 may be updated by a remote server to ensure coordination among host systems. However, in instances where host systems 100 are hosting guest operating environments that are members of different domains, or a domain in which the host system itself is not a member, it may not be easy to directly update the host time in cooperation with other environments within an enterprise. Rather, guest operating environments 150 that are hosted within the host system 112 may manage their own guest time 152. This guest time 152 may be, for example, an enterprise time that is shared among guest operating environments that are communicatively interconnected within the enterprise, but may not be shared with all guest operating environments hosted by the host computing system or host operating environment 112. For instance, multiple guest operating environments 150 are shown in FIG. 1, and only some of those may be managed within a common enterprise domain or environment in which common time is required. Others of the guest operating environments may be members of other domains/environments having a different common time. As such, the guest operating environments 150 may not all obtain a time value directly from the host time 114 of host operating environment 112, since each may have its own enterprise or domain time requirements. Still further, some host operating environments 112 may not provide permissions for guest operating environments 150 to directly manage the host time 114, so conforming the host to the guests may also not be possible.

Accordingly, in the embodiment shown, the host operating environment 112 further hosts a guest operating environment manager 120 that includes a time synchronization manager 122. In example embodiments, the guest operating environment manager 120 may be provided as a service that executes within the host operating environment 112 (e.g., initiated at startup of the host operating environment 112). Optionally, the guest operating environment manager 120 may be part of a system for managing guest environments, such as virtualization software that may be provided on the host computing system 102.

In the embodiment shown, the time synchronization manager 122 maintains a time delta value 124. The time synchronization manager 122 has access to the host time 114, but also may have access to an enterprise time, or otherwise to a time that is to be utilized by one or more guest operating environments 150 that are hosted thereon. Accordingly, the time synchronization manager 122 may either initially set a time delta at zero, or may set the time delta based on a difference between a current enterprise time (e.g., either obtained from an enterprise time service within the network 16, or from a guest time 152 maintained by a guest operating environment 150).

Generally, and as discussed further below, once an initial time delta 124 is determined by the time synchronization manager 122, the time synchronization manager 122 can maintain that time delta 124 by periodically accessing a host time 114 and updating the time delta based on any divergence between the actual host time 114 and a calculated, or expected, host time as determined by the time synchronization manager. The time synchronization manager 122 can also seed new guest operating environments 150 with an appropriate enterprise, or guest, time, based on the host time 114 and the time delta 124 currently in place, thereby maintaining appropriate guest times/enterprise times without having to directly modify the host time 114. Additional details regarding management of the time delta 124 for purposes of synchronizing host time 114 with a guest time 152 (e.g., enterprise time) are described below in conjunction with FIGS. 4-9.

Figure 2:
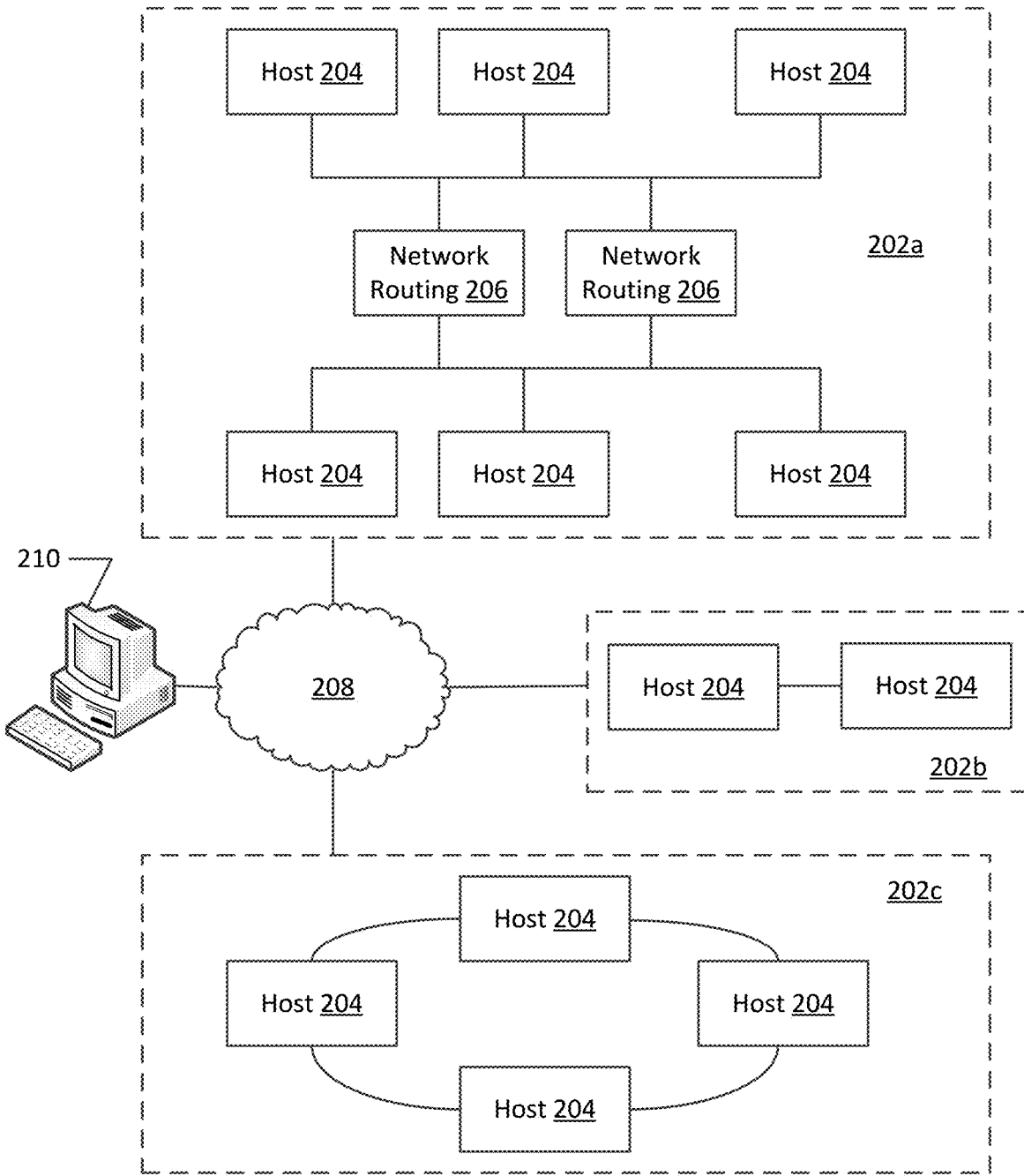
FIG. 2 illustrates a distributed multi-host system in which aspects of the present disclosure can be implemented.
Figure 3:
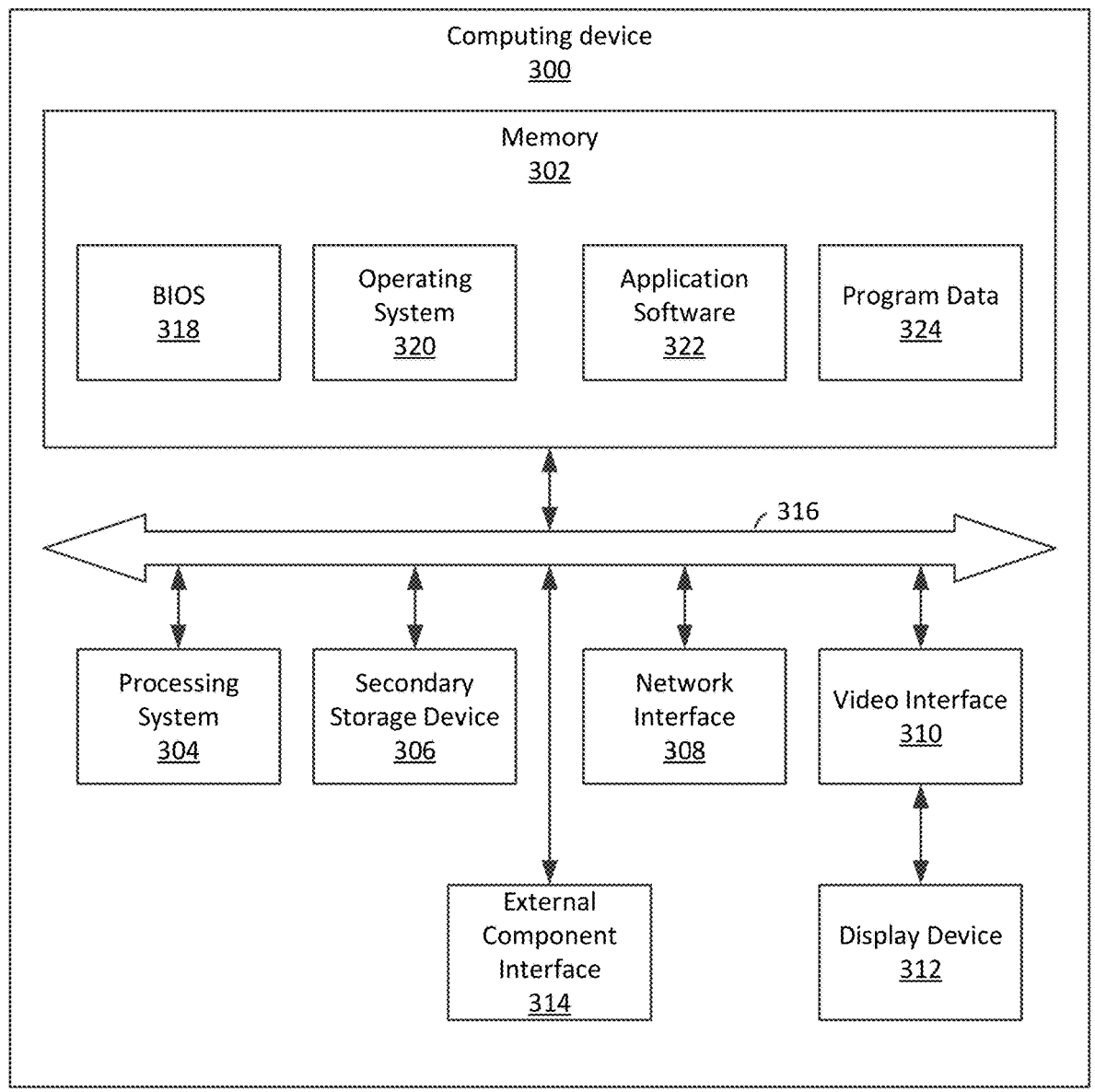
FIG. 3 is a block diagram of a computing system in which aspects of the present disclosure can be implemented.

Referring to FIGS. 2-3, additional details regarding an environment in which the host operating environment may reside are provided. As illustrated in FIG. 2, a location 202 within the system 200 can be organized in a variety of ways. In the embodiment shown, a first location 202a includes network routing equipment 206, which routes communication traffic among the various host systems 204, for example in a switched network configuration. Second location 202b illustrates a peer-to-peer arrangement of host systems. Third location 202c illustrates a ring arrangement in which messages and/or data can be passed among the host computing systems themselves, which provide the routing of messages. Other types of networked arrangements could be used as well.

In various embodiments, at each location 202, the host systems 204 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 202a-c, a variety of communication technologies can also be used to provide communicative connections of host systems 204 at different locations. For example, a packet-switched networking arrangement, such as via the Internet 208, could be used. Preferably, the interconnections among locations 202a-c are provided on a high-bandwidth connection, such as a fiber optic communication connection.

In the embodiment shown, the various host system 204 at locations 202a-c can be accessed by a client computing system 210. The client computing system can be any of a variety of desktop or mobile computing systems, such as a desktop, laptop, tablet, smartphone, or other type of user computing system. In alternative embodiments, the client computing system 210 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well, for example management services applications that are provided by a fabric service manager application.

It is noted that, in various embodiments, different arrangements of host systems 204 within the overall system 200 can be used; for example, different host systems 204 may have different numbers or types of processing cores, and different capacity and type of memory and/or caching subsystems could be implemented in different ones of the host system 204. Furthermore, one or more different types of communicative interconnect technologies might be used in the different locations 202a-c, or within a particular location.

In FIG. 2, an example system 200 is shown that can be implemented within an enterprise. The system 200 is, in the embodiment shown, distributed across one or more locations 202, shown as locations 202a-c. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 202a-c each includes one or more host systems 204. The host systems 204 represent host computing systems 100 of FIG. 1, and can take any of a number of forms. For example, the host systems 204 can be server computing systems having one or more processing cores and memory subsystems and are useable for large-scale computing tasks. In one example embodiment, a host system 204 can be as illustrated in FIG. 3.

In FIG. 3, a schematic illustration of an example computing system 300 is provided. In various embodiments, the computing device 300 implements one particular instruction set architecture, such as the x86, x86-64, or IA64 instruction set architectures. In alternative embodiments, other instruction set architectures, such as ARM, MIPS, Power, SPARC, or other commodity instruction set architecture can be used. The computing device 300 can be used to execute instructions to provide a host computing device capable of hosting a host computing environment, e.g., as implemented using a commodity operating system as described above.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to one or more display units 312. The one or more display units 312 can be various types of devices for displaying video information, such as an LCD display panel, a plasma screen display panel, a touch-sensitive display panel, an LED screen, a cathode-ray tube display, or a projector. The video interface 1410 can communicate with the display unit(s) 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communication medium 316 facilitates communication among the memory 302, the processing system 304, the secondary storage device 306, the network interface card 308, the video interface 310, and the external component interface 314. The communication medium 316 can be implemented in various ways. For example, the communication medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300.

Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Referring to FIGS. 2-3 generally, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIGS. 2-3 may be integrated onto a single integrated circuit. Such an SOC device may include one or more processing units, graphics units, communications units, system virtualization units and various application functionality all of which are integrated (or "burned") onto the chip substrate as a single integrated circuit. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Although particular features are discussed herein as included within a computing device, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, although in the embodiments of FIGS. 2-3 shown, the computing devices represent a physical computing system, the various endpoints and servers of the present disclosure need not be directly implemented on a hardware-compatible system. Rather, such endpoints or servers could be implemented within a virtual computing system or virtual partition of a computing system. In some embodiments, the endpoints and/or servers of the present disclosure are implemented in a partitioned, multiprocessor environment, with the various partitions in which endpoints and/or servers reside being managed by a system virtualization software package.

Figure 4:
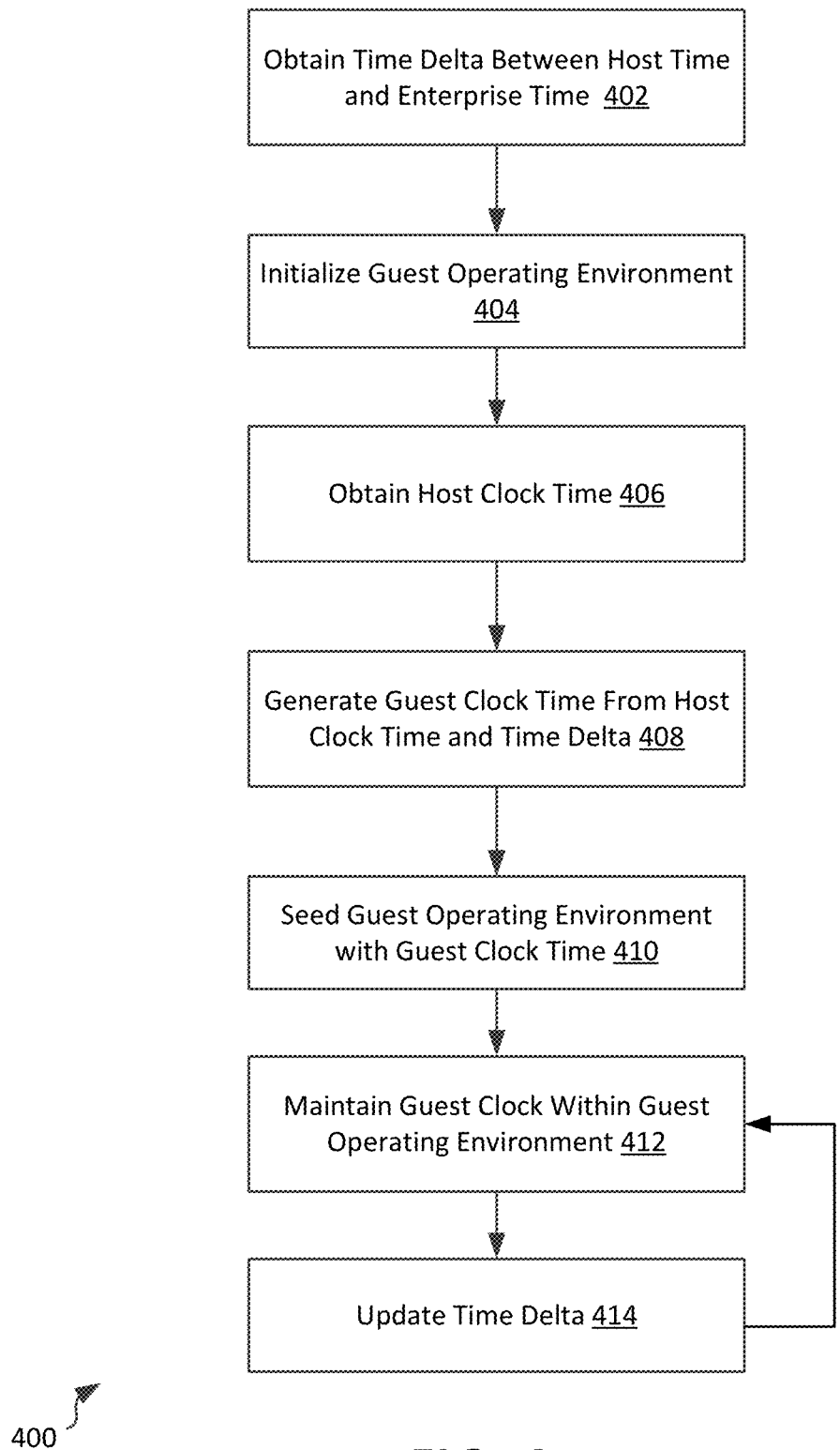
FIG. 4 illustrates a flowchart of a method for providing a guest time value to a guest operating environment at initialization of the guest operating environment, according to aspects of the present disclosure.
Figure 5:
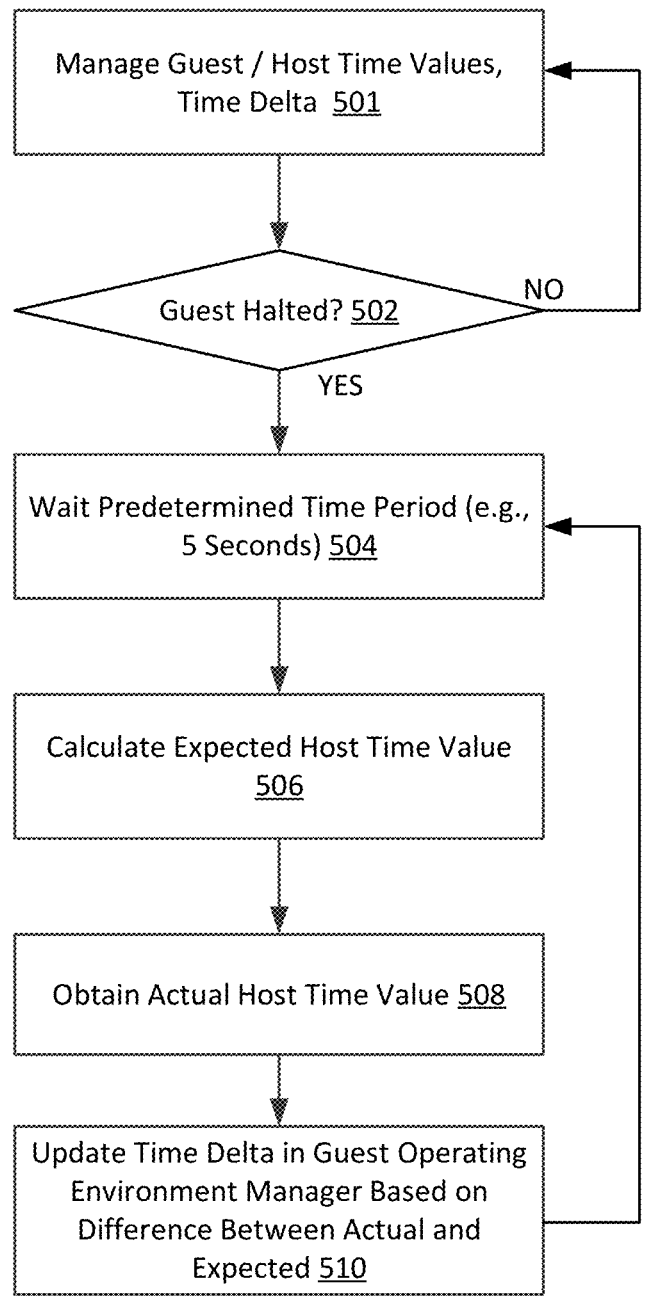
FIG. 5 illustrates a flowchart of a method for managing a time delta between a host time value and a guest time value, according to aspects of the present disclosure.

Referring now to FIGS. 4-5, methods of managing time for guest operating environments hosted within host operating environments on such host computing systems are described. FIG. 4 illustrates a flowchart of a method 400 for providing a guest time value to a guest operating environment at initialization of the guest operating environment, according to aspects of the present disclosure. Generally the method 400 can be performed by a guest operating environment manager and optionally a guest operating environment as well, in example embodiments. Method 400 generally is initiated at a time a guest operating environment is instantiated or resumed (e.g., restarted after a halt) within a host operating environment. In such an instance, the host operating environment is executing, and a guest operating environment manager is also executing within the host operating environment, e.g., initiated upon startup of the host operating environment.

In the example shown, the guest operating environment manager obtains and maintains a time delta between a host time value and a guest time value (step 402). The host time value corresponds to a host time managed by the host operating environment, and the guest time value corresponds to a time value of the guest operating environment, for example as dictated by an enterprise network. In example implementations, the time delta may be initialized at zero if no guest time value is available or if no enterprise network is used. In other example implementations, the time delta may be initialized based on a difference between the host time value and an enterprise time value accessed from a remote resource, or from some other guest operating environment.

In the embodiment shown, the method 400 includes initializing a guest operating environment (step 404). Initializing the guest operating environment can include, for example, provisioning a guest partition and initializing execution of a guest operating environment within be cast partition. The guest operating environment may be, for example, a virtualized environment hosting a different computing architecture then that of the host operating environment. In some examples, while the hos top rating environment may be a Windows or Linux operating environment, the guest operating environment may be, for example, a MCP environment provided by Unisys Corporation of Blue Bell, Pa.

In the embodiment shown, the method 400 includes obtaining a host clock time (step 406). The host clock time may be obtained from the host operating environment by the guest operating environment manager at the time the guest operating environment is initialized. The method 400 further includes generating a guest clock time based on the host clock time and the time delta managed by the guest operating environment manager (step 408). The guest clock time maybe, for example, calculated based on adding the time delta to the host clock time. Once the guest clock time it is generated, the guest operating environment may be seeded with the guest clock time by the guest operating environment manager (step 410). Thereafter, the guest operating environment will maintain the guest clock time autonomously (step 412), i.e., independently of the guest operating environment manager and host operating environment. Similarly, the host operating environment will independently maintain the host time value independently of the guest operating environment. Of course, the guest operating environment may refer to a remote system to ensure synchronization of the guest clock with other computing systems (including guest computing systems) that are required to maintain a common time domain with that guest operating environment.

In addition, the method 400 includes updating the time delta during the time in which both the host operating environment and guest operating environment execute (step 414). In example embodiments, this includes periodically sampling both the guest time value and the host time value to recalculate the time delta. This may occur, for example, every 5 seconds, or some alternative periodic or sporadic instance that is sufficiently frequent so as to capture any divergence between the time values, while not being so frequent as to hinder performance of the host computing system.

Referring to FIG. 4 generally, it is noted that although a single time delta and a single guest clock time are described, more than one time delta and more than one guest clock time may be managed by a single guest operating environment manager. For example, a separate time delta may be managed and tracked by the guest operating environment manager for each time domain that is managed in association with the host computing system on which the guest operating environment manager executes.

Referring now to FIG. 5 a flowchart of a method 500 for managing a time delta between a host time value and a guest time value is shown, according to aspects of the present disclosure. The method 500 may be used in particular to maintain any time delta for a guest operating environment whose execution may be paused or halted, to ensure that a guest time value at the time of resumed execution of the guest operating environment remains accurate relative to the guest time value at the time execution is paused. This may account for any time discrepancies that may occur during the period in which the test operating environment is paused, e.g., if the host time value diverges from expectation during that time.

In the embodiment shown, the method 500 includes managing the guest and host time values (step 501). Generally, this can include both allowing the guest operating environment to manage its own time value, and periodic synchronization of guest and host time values (e.g., as in steps 412-414 of FIG. 4).

The guest operating environment manager may be configured to detect whether a guest operating environment is paused or halted (step 502); while the guest operating environments managed by the guest operating environment manager are not paused, the periodic sampling and updating of the one or more time deltas may continue. However, if the guest operating environment manager detects that a guest has been paused or halted, the guest operating environment manager can generally continue to ensure that differences between the actual host time and an expected host time are reflected in the time delta. In particular, the guest operating environment manager may wait a predetermined time period from a last assessment of the host time (step 504) and calculate an expected host time value by adding the time period to the last host time value that was accessed (step 506). The guest operating environment manager will then obtain the actual host time value from the host operating environment (step 508). Based on a difference between the actual host time value and the expected host time value, the guest operating environment manager can then update the time delta, despite the guest operating environment not being executed at the time (step 510). In particular, the updated time delta may be calculated as the previous time delta plus any time deviation determined based on the difference between actual and expected host time values during the predetermined period. As noted above, the predetermined time period may be, for example, 5 seconds; however, other time periods may be utilized as well. In addition, the predetermined time period for updating the time delta during pause of a guest operating environment may be a different time period is used for sampling time values from the guest and host operating environments.

As illustrated in FIG. 5, while the guest is halted, the host time value may be obtained and compared to a calculated expected host time value periodically; upon detection of resumption of the guest operating environment, that guest operating environment may be a reseeded with an updated guest time based on the then-current time delta and host time value.

Optionally, of course, the guest operating environment manager may continue to calculate the expected host time value and compare it to the actual host time value during execution of the guest operating environment; however such calculations are not necessary if no guest operating environment is paused. Continuing to calculate an expected host time value may have a slight computational overhead, but is nevertheless optionally performed.

Referring now to FIGS. 6-10, an example sequence of operations as outlined in FIGS. 4-5 are illustrated in the context of the host computing system 100 of FIG. 1, and in particular, within the host operating environment 112.

Figure 6:
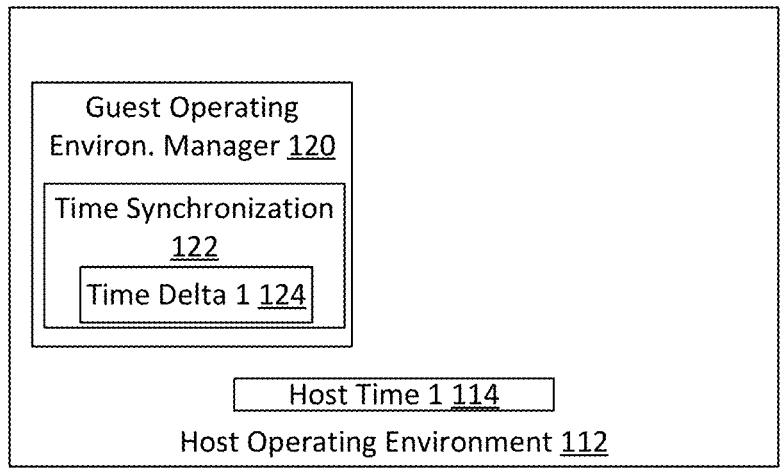
FIG. 6 illustrates an example implementation of the method of FIG. 4 in which a host time value is used to generate a guest, or enterprise, time value.

FIG. 6 illustrates an initial state of a host operating environment 112. As illustrated, the host operating environment 112 has a host time 114, shown as host time 1. Additionally, a guest operating environment manager 120 includes a time synchronization manager and 122 having a time delta 124 initialized therein. The time delta 124, shown as time delta 1, may be initialized at zero or some other known value, as may be obtained from an enterprise network service.

Figure 7:
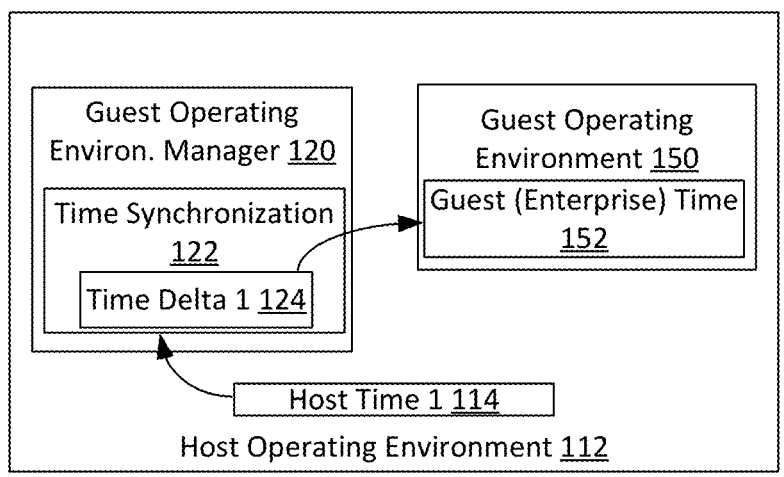
FIG. 7 illustrates an example implementation of the method of FIG. 4 in which a host time value is used to generate a guest, or enterprise, time value.

As seen in FIG. 7, when a guest operating environment 150 is initialized, the guest operating environment manager 120 will read the host time value 114 and the time synchronization manager 122 will add the host time value 114 to the time delta 124 (e.g., Host Time 1+Time Delta 1) to arrive at the guest time 152. Accordingly, during initialization of the guest operating environment 150 the guest operating environment manager 120 will seed the guest operating environment with the guest time 152. Thereafter, the guest operating environment 150 will manage the guest time 152, and the host operating environment 112 will manage the host time 114.

Figure 8:
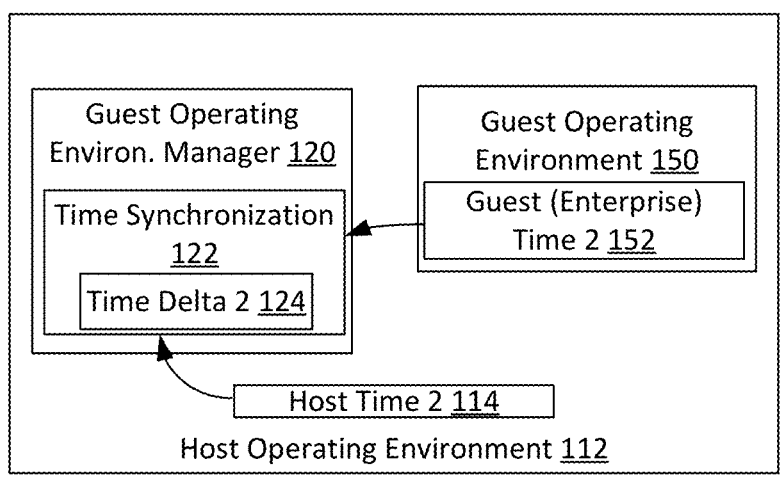
FIG. 8 illustrates an example implementation of the method of FIG. 4 in which a host time value and guest time value are used to maintain a time delta within a guest operating environment manager.

FIG. 8 illustrates an example implementation of the method of FIG. 4 in which a host time value and guest time value are used to maintain a time delta within a guest operating environment manager. In particular, FIG. 8 illustrates schematically the process executed in steps 410-412, within the context of a host computing system 100 of FIG. 1. In the example shown, at some time after initiation of the guest operating environment 150, the host time 124 has advanced to host time 2 and the guest time 152 has advanced to guest time 2. The guest operating environment manager 120, and in particular the time synchronization manager 122, will access and sample the host time 124 and the guest time 152, and will determine a difference between those times. An updated time delta can be calculated (e.g., updated time delta=guest time 2−host time 2) and stored. Accordingly, the time delta can be used for reseeding of a restarted guest operating environment.

Figure 9:
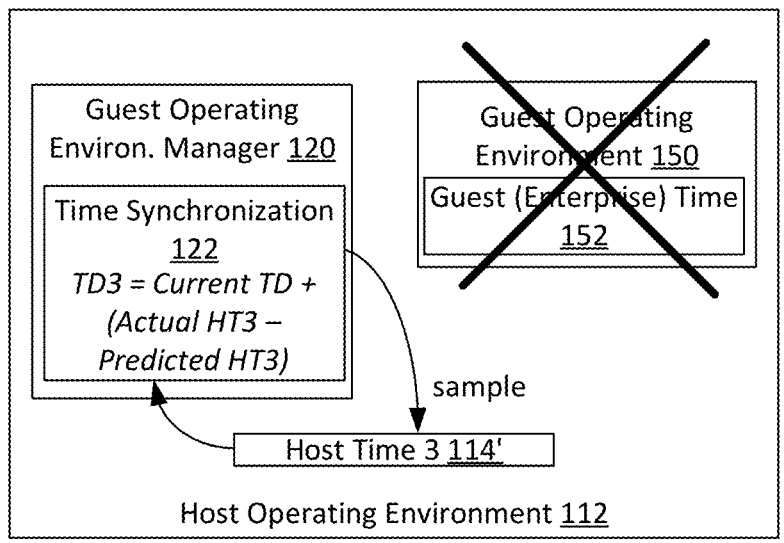
FIG. 9 illustrates an example implementation of managing a time delta using a guest operating environment manager, for example during halt of one or more guest operating environments, on a host computing system, in accordance with the method described in FIG. 5.
Figure 10:
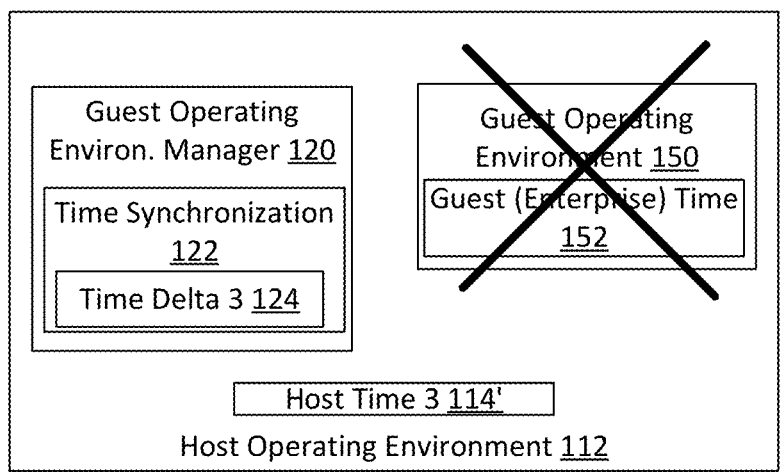
FIG. 10 illustrates an example of an updated time delta based on periodic reassessment of a host time value, in accordance with the method described in FIG. 5.

FIG. 9 illustrates an example implementation of managing a time delta using a guest operating environment manager 120, for example during halt of one or more guest operating environments, on a host computing system 100. As discussed above in conjunction with FIG. 5, the guest operating environment of 150 may be halted. During the time the guest operating environment 150 has halted, the guest operating environment manager 120 can maintain a time delta as compared to the host time 114. Specifically, a time synchronization manager 122 can sample the host time 114 periodically (e.g., every 5 seconds) and also calculate a predicted host time. A difference between the host time and the predicted host time can be added to the current time delta to arrive at a new time delta. In the example shown, actual host time 3 is sampled, and should be a periodic amount of time after a previous time. The guest operating environment manager 120 will predict a host time by using a previously-sampled host time and adding the periodic time to that previously sampled host time, to arrive at predicted host time 3. The difference between these is added to the current time delta, to arrive at a new time delta, referred to in FIG. 9 as TD3. Accordingly, and as seen in FIG. 10, the time delta 124 is updated to the new time delta, time delta 3.

Referring to FIGS. 6-10 generally, it is noted that although a single time delta is shown, more than one time built up may be tracked, for example one time delta may be tracked for each time domain used by one or more guest operating environments.

Referring now to FIGS. 1-10 generally, it is noted that the time management processes described herein provide advantages over existing time management techniques for guest, or virtualized, systems. For example, such guest operating environments do not need to be able to directly modify the host time in a host operating environment, nor do the guest systems need to conform to the host time. Accordingly, multiple guest operating environments may coexist within a host operating environment, using different time domains, and optionally using a single desktop operating environment manager, reducing complexity and computational overhead issues. Additionally, host operating environments needed not grant guest operating environments permissions that would otherwise be required to modify the host time.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of synchronizing time between a guest operating environment and a hosting operating environment executing on a host computing system, the method comprising:
within a guest operating environment manager executing within a hosting operating environment, maintaining a time delta between a host clock and an enterprise time to be used by a guest operating environment;
upon initialization of the guest operating environment within a hosting operating environment:
obtaining a host clock time;
generating a guest clock time that is based on the host clock time and a time delta managed by the guest operating environment manager; and
seeding the guest operating environment with the guest operating time;
during execution of the guest environment, managing the guest operating time within the guest environment;
upon stoppage of the guest environment:
periodically sampling the host clock by the guest operating environment manager to detect divergence between an actual value of the host clock and an expected value of the host clock time; and
updating the time delta within the guest operating environment manager based on the divergence between the actual value and the expected value; and
upon restart of the guest environment, re-seeding the guest environment with an updated guest time that is based on the host clock time and the updated time delta.

2. The method of claim 1, wherein the time delta represents a number of seconds difference between the host clock time and the enterprise time.

3. The method of claim 1, further comprising:
during execution of the guest environment, periodically updating the time delta managed by the guest operating environment manager based on changes in a difference between the guest operating time and the host clock.

4. The method of claim 3, wherein periodically updating the time delta comprises determining the difference between the guest operating time and the host clock time every five seconds.

5. The method of claim 1, wherein periodically sampling the host clock by the guest operating environment manager comprises sampling the host clock time every five seconds.

6. A method of synchronizing time between a guest operating environment and a hosting operating environment executing on a host computing system, the method comprising:
within a guest operating environment manager executing within a hosting operating environment, maintaining a time delta between a host clock and an enterprise time to be used by a guest operating environment;
upon initialization of the guest operating environment within a hosting operating environment:
obtaining a host clock time;
generating a guest clock time that is based on the host clock time and a time delta managed by the guest operating environment manager; and
seeding the guest operating environment with the guest operating time;
during execution of the guest environment, managing the guest operating time within the guest environment;
upon stoppage of the guest environment, periodically sampling the host clock by the guest operating environment manager to detect divergence between an actual value of the host clock and an expected value of the host clock time,
wherein periodically sampling the host clock by the guest operating environment manager comprises sampling the host clock time each periodic elapsed time, and
wherein the divergence between the actual value of the host clock time and the expected value of the host clock time is based on a comparison between a current value of the host clock and a calculated time value representing the periodic elapsed time from a previous reading of the host clock time.

7. A system for synchronizing time between a guest operating environment and a hosting operating environment executing on a host computing system, the system comprising:
a guest operating environment executing on the host computing system, the guest operating environment being hosted by the hosting operating environment;
a guest operating environment manager executing on the host computing system within the hosting operating environment, the guest operating environment manager including a time synchronization subsystem which, when executed by the guest operating environment manager on the host computing system, causes the host computing system to:
obtain a host clock time from a hosting operating environment;
generate a guest clock time that is based on the host clock time and a time delta managed by the guest operating environment manager;

at initiation of the guest operating environment, seed the guest operating environment with the guest operating time such that, during execution of the guest environment, the guest operating environment manages the guest operating time independently of the host clock time;

upon stoppage of the guest environment:
periodically sample the host clock by the guest operating environment manager to detect divergence between an actual value of the host clock and an expected value of the host clock time; and
update the time delta within the guest operating environment manager based on the divergence between the actual value and the expected value; and upon restart of the guest environment, re-seed the guest environment with an updated guest time that is based on the host clock time and the updated time delta.

8. The system of claim 7, wherein, during execution of the guest operating environment, the guest operating environment manager periodically updates the time delta.

9. The system of claim 8, wherein the time delta represents a difference between the host clock time and an enterprise time utilized by the guest operating environment.

10. The system of claim 9, wherein the enterprise time is utilized by a plurality of guest operating environments executing on a plurality of different host computing systems within an enterprise, the plurality of guest operating environments including the guest operating environment.

11. The system of claim 7, wherein the hosting operating environment hosts a plurality of hosted operating environments including the hosted operating environment.

12. A system for synchronizing time between a guest operating environment and a hosting operating environment executing on a host computing system, the system comprising:
a host computing system comprising:
a processor;
a memory communicatively connected to the processor, the memory storing instructions which, when executed, cause the host computing system to perform:
within a guest operating environment manager executing within a hosting operating environment, maintaining a time delta between a host clock and an enterprise time to be used by a guest operating environment;
upon initialization of the guest operating environment within a hosting operating environment:
obtaining a host clock time;
generating a guest clock time that is based on the host clock time and a time delta managed by the guest operating environment manager; and
seeding the guest operating environment with the guest operating time;
during execution of the guest environment, managing the guest operating time within the guest environment;
upon stoppage of the guest environment:
periodically sampling the host clock by the guest operating environment manager to detect divergence between an actual value of the host clock and an expected value of the host clock time; and
updating the time delta within the guest operating environment manager;
based on the divergence between the actual value and the expected value; and
upon restart of the guest environment, re-seeding the guest environment with an updated guest time that is based on the host clock time and the updated time delta.

13. The system of claim 12, further comprising a plurality of host computing systems communicatively interconnected within an enterprise, the plurality of host computing systems each hosting one or more guest operating environments, wherein the guest operating time corresponds to an enterprise time utilized by each of the guest operating environments.

14. The system of claim 12, wherein the host operating environment comprises a commodity operating system environment and the guest operating environment comprises a virtualized operating environment.

15. The system of claim 12, wherein the host clock time is managed by the commodity operating system based on output of host computing system clock hardware.

* * * * *